United States Patent [19]
Robbins, III et al.

[11] Patent Number: 6,041,979
[45] Date of Patent: Mar. 28, 2000

[54] MEASURING DISPENSING CAP

[75] Inventors: Edward S. Robbins, III, 128 Hazelwood La., Florence, Ala. 35630; Don B. Walker, II, Florence, Ala.; Harry L. Raney, Russellville, Ala.; Joseph B. Swann, Florence, Ala.

[73] Assignee: Edward S. Robbins, III, Florence, Ala.

[21] Appl. No.: 09/063,467

[22] Filed: Apr. 20, 1998

[51] Int. Cl.$^7$ .............................. G01F 11/28; B65D 47/00
[52] U.S. Cl. ...................... 222/434; 222/440; 222/442; 222/452; 222/548
[58] Field of Search .............................. 222/548, 424.5, 222/425, 434, 438, 440, 442, 450, 452, 451

[56] References Cited

U.S. PATENT DOCUMENTS

| | | | |
|---|---|---|---|
| 1,684,313 | 9/1928 | Graham | 222/452 |
| 2,529,004 | 11/1950 | Eley | 222/48 |
| 2,655,290 | 10/1953 | Mansperger | 222/181 |
| 3,109,546 | 11/1963 | Baruh | 215/21 |
| 3,197,091 | 7/1965 | Millard | 222/522 |
| 3,223,296 | 12/1965 | Waddington et al. | 222/442 |
| 3,424,355 | 1/1969 | Blumen | 222/450 |
| 4,162,749 | 7/1979 | Bennett | 222/633 |
| 4,345,700 | 8/1982 | Souza | 222/438 |
| 4,767,027 | 8/1988 | Lewinter et al. | 222/158 |
| 4,807,785 | 2/1989 | Pritchett | 222/442 |
| 4,832,235 | 5/1989 | Palmer | 222/370 |
| 5,165,576 | 11/1992 | Hickerson | 222/158 |
| 5,186,367 | 2/1993 | Hickerson | 222/207 |
| 5,358,152 | 10/1994 | Banks | 222/442 |

OTHER PUBLICATIONS

Welch Allyn, Inc., pamphlet entitled PATHWAYS:*A Complete Catalog of Diagnostic Instruments for the Ears, Nose and Throat*.

*Primary Examiner*—Joseph A. Kaufman
*Assistant Examiner*—Keats Quinalty
*Attorney, Agent, or Firm*—Locke Reynolds LLP

[57] ABSTRACT

A cap for dispensing material from a container defining an interior portion, including a housing capable of attachment to the container and including a translucent region, and defining an aperture, a first opening, and a second opening, and a spout member disposed through the aperture and defining a transfer compartment, having a first end and a second end and defining an inlet orifice at the first end and an outlet orifice at the second end, the spout member rotatably movable with respect to the housing between a first position where the inlet orifice is disposed to generally align with the first opening and communicate with the interior portion and the outlet orifice is disposed within and closed by the housing whereby material within the container may be transferred from the interior portion into the transfer compartment through the inlet orifice but material may not be dispensed from the container, and a second position where the inlet orifice is disposed within and closed by the housing and the outlet orifice is generally aligned with the second opening whereby material within the transfer compartment may be dispensed from the cap through the outlet orifice but material within the container may not be transferred into the transfer compartment, the second end including a translucent portion for alignment with the translucent region, permitting visual determination of a quantity of material within the transfer compartment prior to dispensing.

19 Claims, 4 Drawing Sheets

MEASURING DISPENSING CAP

BACKGROUND OF THE INVENTION

1. Field of the Invention

The present invention generally relates to caps for containers usable for storage and dispensing of liquids and particulate solids, and more particularly concerns caps of the type that are capable of dispensing a stored liquid or particulate solid in a measured amount that may be selected by the user without removal from the container.

2. Description of the Prior Art

There are presently available a number of caps for containers that may be used to store liquids, such as detergents, and particulate solids. In addition, available caps may be capable of use for dispensing a measured portion of the liquid or particulate solid, by removal of the cap from the container, pouring the desired amount of liquid or particulate solid into the cap while disposed in an inverted position, and then pouring the liquid or particulate solid from the cap.

Despite the availability of such caps, there exists a need in the art for a measuring dispensing cap that is capable of conveniently dispensing a measured portion of a liquid or particulate solid from a container without removal of the cap from the container, with the volume of material to be dispensed selected by the user to be any volume up to a maximum volume, and simultaneously preventing the remaining stored material from being dispensed or spilled during the dispensing operation.

SUMMARY OF THE INVENTION

In order to aid in the understanding of the present invention, it can be stated in essentially summary form that it is directed to a measuring dispensing cap for attachment to a container for a liquid or particulate solid that is capable of dispensing therefrom in a controlled manner a measured portion of the liquid or particulate solid without removing the cap from the container, the measured portion selected by the user to be any volume up to a maximum volume, while simultaneously preventing the remaining stored material from spilling or being dispensed.

More specifically, the present invention is directed to a measuring dispensing cap that is detachably mountable to a container, the cap including a housing and a spout member. The housing includes a flanged threaded collar for detachable threaded engagement with a threaded portion of the container, the container defining an interior portion capable of holding a material such as a liquid or particulate solid. The housing may be formed to include an end piece, and further defines therethrough a tab bore, an aperture, and also a first opening and a second opening at generally opposing ends of the aperture. The housing may include a cylindrical sleeve, with the first opening formed as a curved rectangular opening therethrough. The housing may also be formed to include a generally domed exterior portion proximate to the second opening, and the second opening may include a generally arcuate pouring mouth. The domed exterior portion may include a translucent or transparent region. The housing may also define an endless slot generally surrounding the domed exterior portion and the second opening, and may define a weep hole communicating with the slot. The housing also defines therethrough at least one pressure relief passage at the domed exterior portion.

A spout member is provided and is rotatably disposed generally within the housing and through the aperture. The spout member defines a transfer compartment, and includes first and second ends. The first end is disposed to rotate within an annular slot defined by the end piece of the housing. The spout member further defines therethrough an inlet orifice proximate to the first end and an outlet orifice proximate to the second end. The spout member may include a spout member cylindrical surface disposed generally coaxially with the housing cylindrical sleeve, and the spout member domed portion disposed within the domed exterior portion of the housing. Where the spout member includes a cylindrical sleeve portion, the inlet orifice may be formed as a curved rectangular opening, generally corresponding to the first opening of the housing. Further, the outlet orifice may be formed to generally correspond with the second opening of the housing. The second end includes a translucent or transparent portion permitting visual determination of a quantity of material within the transfer compartment through the transparent or translucent region of the housing prior to dispensing. The inlet orifice and the outlet are disposed at an acute angle of approximately 90 degrees with respect to a rotational axis defined by the spout member and the housing, while the first and second openings are generally oppositely disposed with respect to this axis of rotation. The spout member defines therethrough at least one pressure relief aperture at the spout member domed portion, communicating with the transfer compartment. The number and positions of the pressure relief apertures are preferably chosen to correspond with the number and position of the pressure relief passages of the housing. As the spout member is rotated with respect to the housing, at least one pressure relief aperture is capable of alignment with at least one pressure relief passage so that ambient air may flow into the transfer compartment. The spout member further includes a projecting graspable tab disposed to project through the tab bore of the housing.

By grasping the tab and applying torque, the spout member may be rotated to a first position where the inlet orifice is in a first position. In the first position, tilting of the container results in transfer of material present within the interior portion of the container to the transfer compartment, with the volume of the material transferred limited by the volume of the transfer compartment. Material transferred into the transfer compartment may not be dispensed from the container while the spout is in the first position.

Spout member may thereafter be rotated to a second position where the inlet orifice is disposed within and closed by the housing cylindrical sleeve, and the outlet orifice is generally aligned with the second opening. In the second position, material present within the transfer compartment may be dispensed from the cap through the outlet orifice and the second opening, but material within the container may not be transferred into the transfer compartment. In the second position, at least one pressure relief aperture is disposed in alignment with at least one pressure relief passage, as previously discussed.

Additionally, the spout member may be rotated to a third position, intermediate of the first and second positions, where the inlet orifice is disposed to at least partially align with the first opening and communicate with the interior portion of the container, and the outlet orifice is at least partially aligned with the second opening. With the spout member in the third position, material within the container may be dispensed in a continuous manner from the interior portion of the container into the transfer compartment through the inlet orifice, and from the transfer compartment and the cap through the outlet orifice.

A plurality of detents may be defined between the tab and the tab bore, whereby the spout member may be maintained in place at each of the first, second, and third positions against torque applied to the tab less than a preselected magnitude. Further, the spout member may also include indicia disposed at the transparent or translucent portion for determining the quantity of material within the transfer compartment prior to dispensing from the present invention.

Residual liquid present near the pour mouth after pouring may drain into the slot through the weep hole, into the trough, between the housing and the spout member and return into the container.

These and other features and advantages of the present invention will become apparent to those skilled in the art upon consideration of the following description of the preferred embodiments exemplifying the best mode of the invention. The following description refers to the accompanying figures illustrating the preferred embodiments of the invention.

DETAILED DESCRIPTION OF THE PREFERRED EMBODIMENTS

Figure 1:
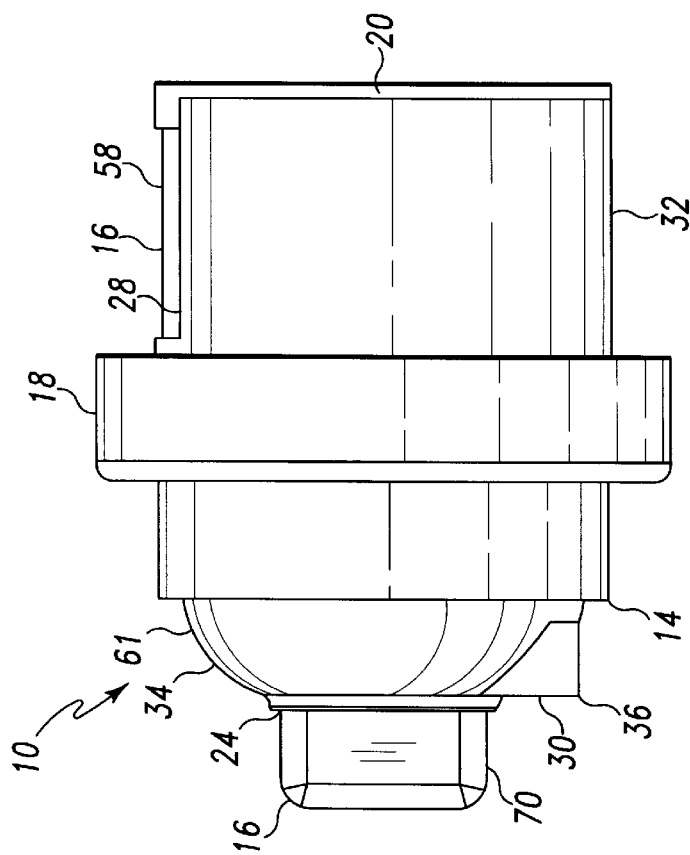
FIG. 1 is a side elevation view of a cap for dispensing material from a container in accordance with the present invention, depicting the spout member in the second position.
Figure 2:
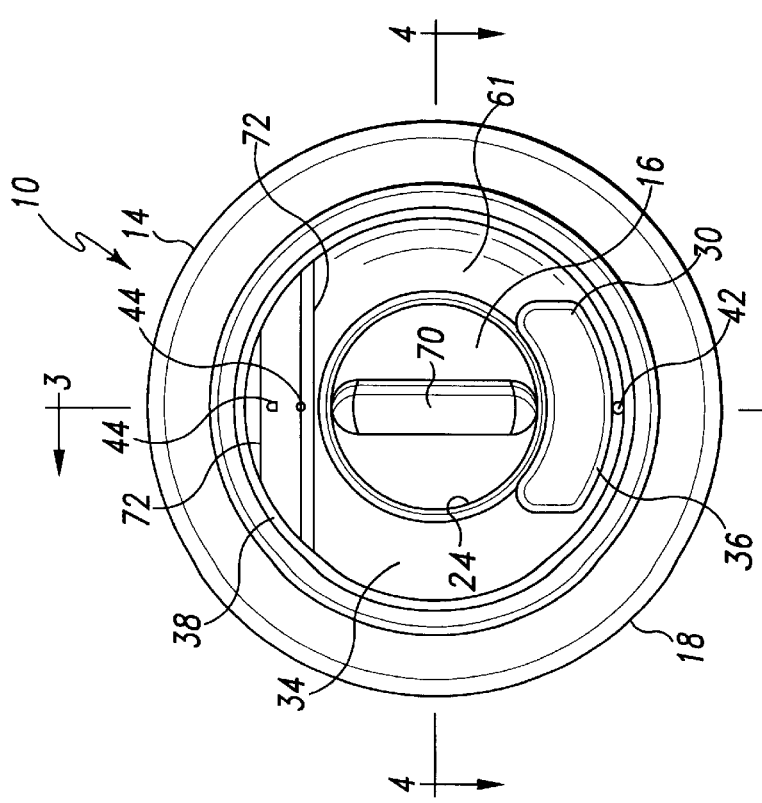
FIG. 2 is an end view of a cap for dispensing material from a container in accordance with the present invention, depicting the spout member in the second position.

Turning now to the drawings for a detailed description of the preferred embodiments, reference is first made to FIGS. 1–4, depicting cap 10 detachably mountable to a container, not shown. Cap 10 includes housing 14 and spout member 16. Housing 14 includes flanged threaded collar 18 for detachable threaded engagement with container threads of the container. The container defines an interior portion capable of holding a material such as a liquid or particulate solid. As depicted, threaded collar 18 includes internal threads for threaded engagement with a container having exterior container threads, however, it will be understood that within the scope of the present invention, threaded collar 18 may similarly include external threads for threaded engagement with a container having internal container threads. Housing 14 may be formed to include end piece 20, and further defines therethrough tab bore 24 and aperture 26. Housing 14 also defines first opening 28 and second opening 30 at generally opposing ends of aperture 26. Where housing 14 includes housing cylindrical sleeve 32, first opening 28 may be formed as a curved rectangular opening. Housing 14 may be formed to include generally domed exterior portion 34 proximate to second opening 30, and second opening 30 may include generally arcuate pouring mouth 36. Domed exterior portion 34 may be formed to have a translucent or transparent region, for visual inspection as will be described. Housing 14 may also define an endless slot 38 generally surrounding domed exterior portion 34 and second opening 30. As will be described, slot 38 may receive residual material from pouring mouth 36. Housing 14 further defines weep hole 42 communicating with slot 38, for transferring residual material from slot 38 through housing 14 and into the container, as will be described. Housing 14 also defines therethrough at least one pressure relief passage 44 at domed exterior portion 34. Although, as depicted in FIGS. 2–6, a pair of pressure relief passages 44 may be provided, with one pressure relief passage 44 disposed at slot 38, it will be recognized that more or less than a pair of pressure relief passages 44 may be defined through housing 14.

Figure 3:
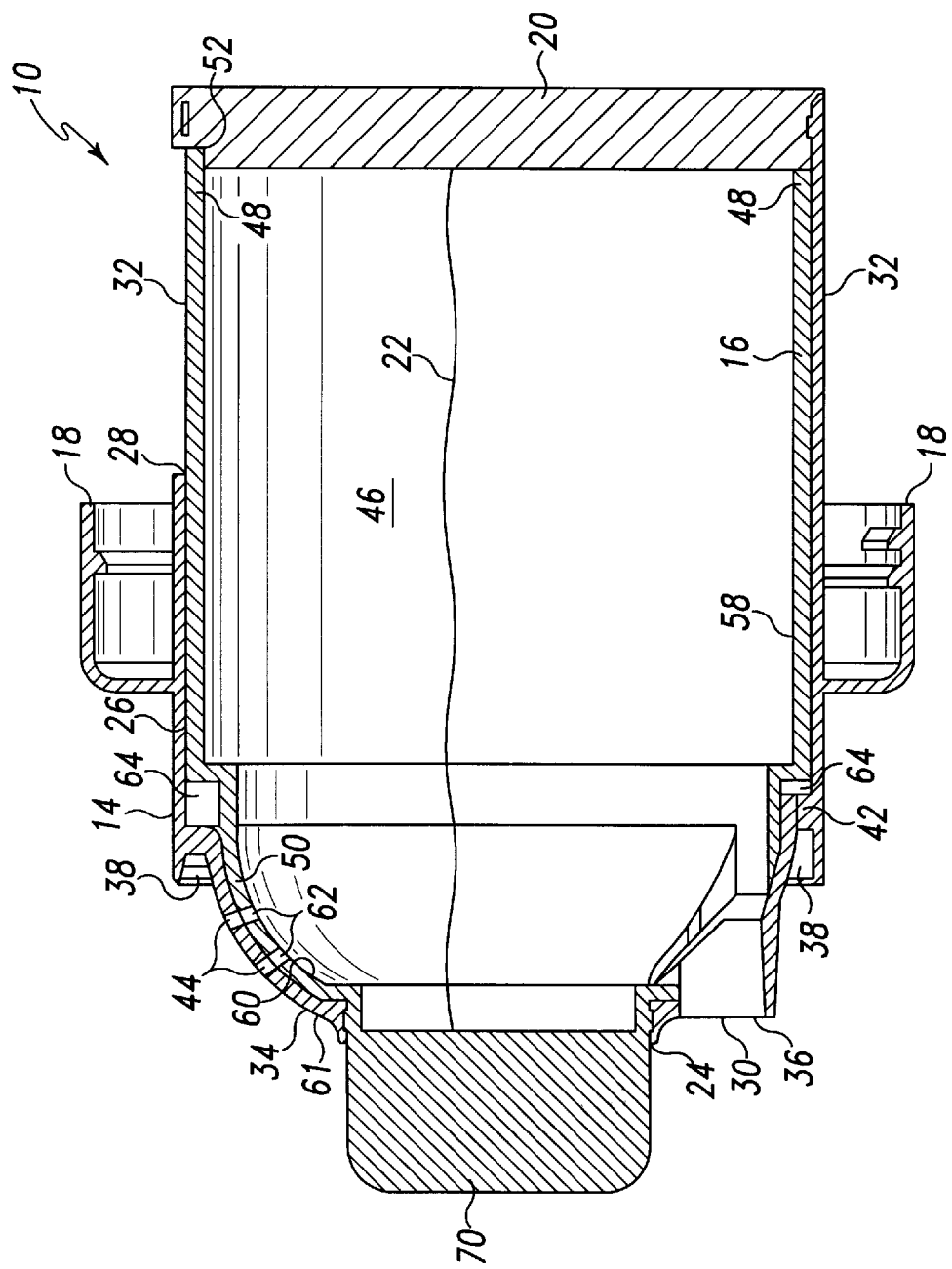
FIG. 3 is a sectional view of a cap for dispensing material from a container in accordance with the present invention, taken along line 3—3 of FIG. 2.
Figure 4:
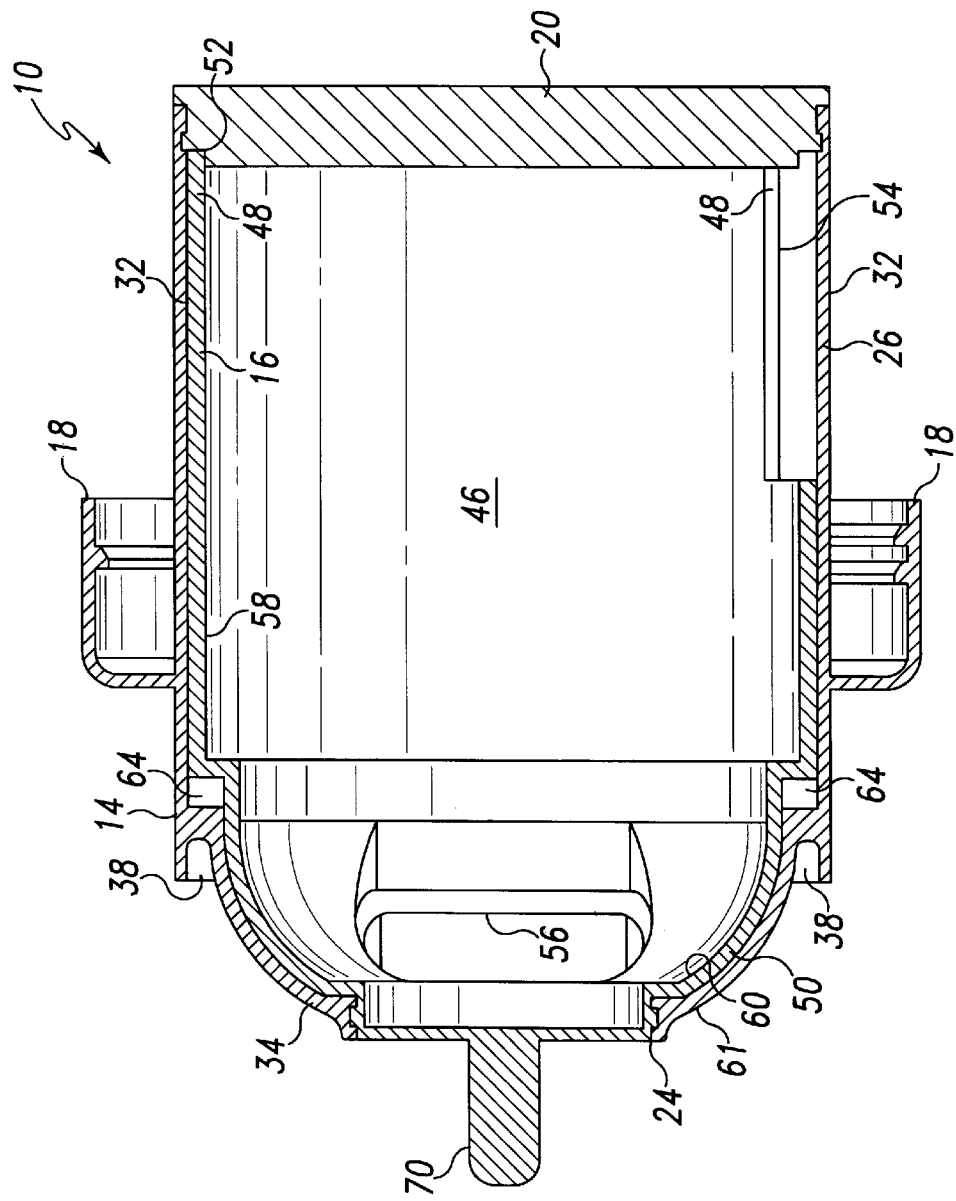
FIG. 4 is a sectional view of a cap for dispensing material from a container in accordance with the present invention, taken along line 4—4 of FIG. 2.

As illustrated in FIGS. 1–4, spout member 16 is rotatably disposed generally within housing 14 and through aperture 26. Spout member 16 defines a transfer compartment 46, and includes first end 48 and second end 50. First end 48 is disposed to rotate within annular slot 52 defined by end piece 20. Spout member 16 further defines therethrough inlet orifice 54 proximate to first end 48 and outlet orifice 56 proximate to second end 50. Spout member 16 may include spout member cylindrical surface 58 disposed coaxially with housing cylindrical sleeve 32, and spout member domed portion 60 disposed within domed exterior portion 34 of housing 14. Where spout member 16 includes spout member cylindrical sleeve 58, inlet orifice 54 may be formed as a curved rectangular opening, corresponding generally to first opening 28. Similarly, outlet orifice 56 may be formed to generally correspond with second opening 30. Second end 50 includes a translucent or transparent portion 61 permitting visual determination of a quantity of material 22 within transfer compartment 46 through transparent or translucent region of domed exterior portion 34 prior to dispensing from the present invention. As illustrated, inlet orifice 54 and outlet orifice 56 are disposed at an acute angle of approximately 90 degrees with respect to a rotational axis defined by spout member 16 and housing 14, while first and second openings 28 and 30 are generally oppositely disposed with respect to such axis of rotation. Spout member 16 defmes therethrough at least one pressure relief aperture 62 at spout member domed portion 60 and communicating with transfer compartment 46. The number and positions of one or more pressure relief apertures 62 is preferably chosen to correspond with the number and position of the at least one pressure relief passage 44, so that as spout member 16 is rotated with respect to housing 14, at least one pressure relief aperture 62 is capable of alignment with at least one pressure relief passage 44 so that ambient air may flow into transfer compartment 46. Spout member 16 includes projecting, graspable tab 64 disposed to project through tab bore 24 of housing 14. With housing 14 and spout member 16 rotatably disposed together as shown in FIGS. 3–4, endless trough 64 is defined therebetween, communicating with weep hole 42 defined through housing 14 at slot 38.

Figure 5:
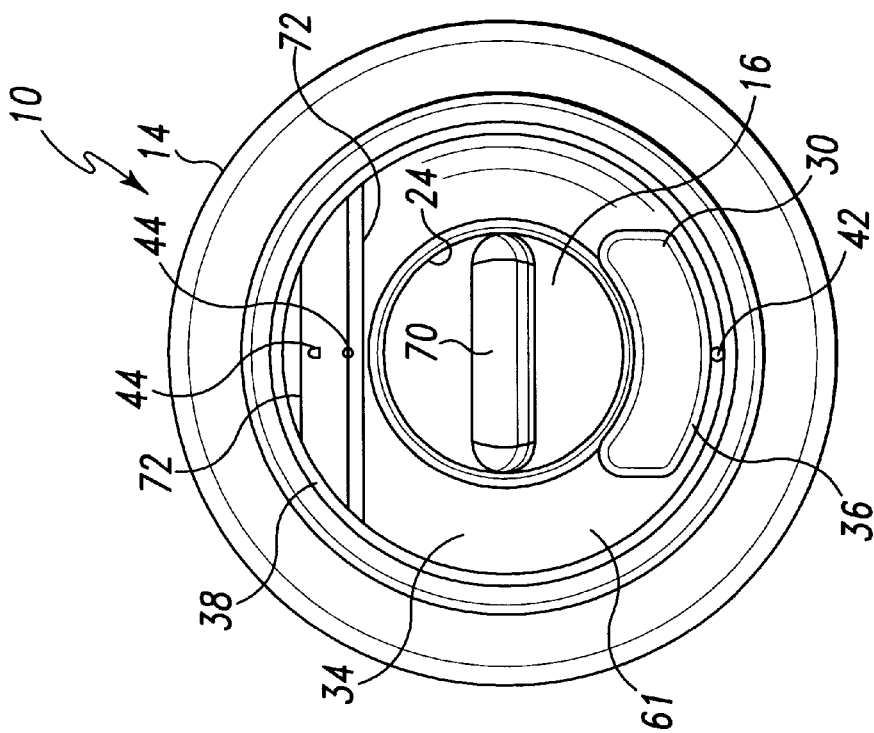
FIG. 5 is an end view of a cap for dispensing material from a container in accordance with the present invention, depicting the spout member in the first position.

By grasping tab 70 and applying torque, spout member 16 may be rotated to a first position, shown in FIG. 5, where inlet orifice 54 generally aligns with first opening 28 and communicates with the interior portion of the container, and outlet orifice 56 is disposed within and closed by domed exterior portion 34 of housing 14. In the first position, tilting of the container results in transfer of material 22 present within the interior portion of the container into transfer compartment 46, with the volume of material 22 so transferred limited by the volume of transfer compartment 46. Material 22 transferred into transfer compartment 46 may not be dispensed from the container while spout member 16 is in the first position.

Referring to FIGS. 1–4, spout member 16 may thereafter be rotated to a second position, where inlet orifice 54 is disposed within and closed by housing cylindrical sleeve 32, and outlet orifice 56 is generally aligned with second opening 30. In the second position, material 22 present within transfer compartment 46 may be dispensed from cap 10 through outlet orifice 56 and second opening 30, but material 22 within the container may not be transferred into transfer compartment 46. In the second position, at least one pressure relief aperture 62 is disposed in alignment with at least one pressure relief passage 44, so that ambient air may enter transfer compartment 46 as material 22 is dispensed from the present invention, advantageously increasing and making more uniform the rate at which material 22 is dispensed.

Figure 6:
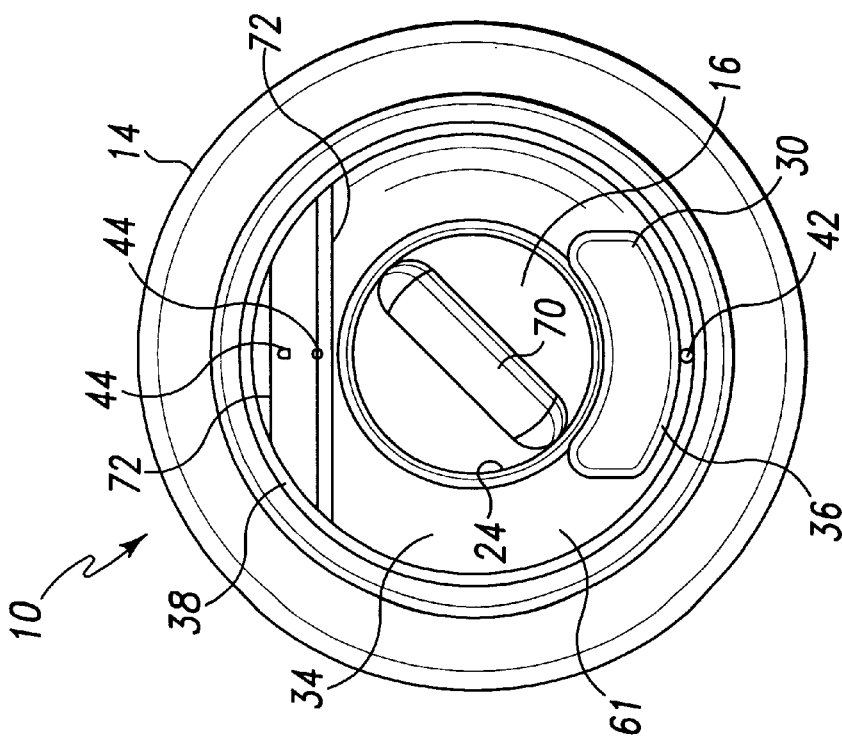
FIG. 6 is an end view of a cap for dispensing material from a container in accordance with the present invention, depicting the spout member in the third position.

In addition, as shown in FIG. 6, spout member 16 may be rotated to a third position, intermediate of the first and second positions, where inlet orifice 54 is disposed to at least partially align with first opening 28 and communicate with the interior portion of the container, and outlet orifice 56 is at least partially aligned with second opening 30. With spout member 16 in the third position, material 22 within the container may be dispensed, being continuously transferred from the interior portion into transfer compartment 46 through inlet orifice 54 and from transfer compartment 46 and cap 10 through outlet orifice 56.

In addition, a plurality of detents may be defined between tab 70 and tab bore 24, whereby spout member 16 may be maintained in place at each of the first, second, and third positions against torque applied to tab 70 less than a preselected magnitude.

Advantageously, spout member 16 may also include indicia 72 disposed at transparent or translucent portion 61 for determining the quantity of material 22 within transfer compartment 46 prior to dispensing from the present invention.

Where a liquid has been dispensed from the present invention, it is not unusual for some residual liquid to remain near pouring mouth 36 after pouring. Such residual liquid may drain into slot 38, through weep hole 42, into trough 64, between housing 14 and spout member 16, and into the container.

The present invention, having been described in its preferred embodiments, it is clear that the present invention is susceptible to numerous modifications and embodiments within the ability of those skilled in the art and without exercise of the inventive facility. Accordingly, the scope of the present invention is defined as set forth of the following claims.

What is claimed is:

1. A cap for dispensing material from a container defining an interior portion, comprising:

a housing capable of attachment to the container and including a translucent region, and defining therethrough an aperture, a first opening, and a second opening, the housing defining therethrough at least one pressure relief passage; and a spout member disposed through the aperture and defining a transfer compartment, the spout member having a first end and a second end and defining therethrough an inlet orifice proximate to the first end and an outlet orifice proximate to the second end, the spout member rotatably movable with respect to the housing between a first position where the inlet orifice is disposed to generally align with the first opening and communicate with the interior portion and the outlet orifice is disposed within and closed by the housing whereby material within the container may be transferred from the interior portion into the transfer compartment through the inlet orifice but material may not be dispensed from the container, and a second position where the inlet orifice is disposed within and closed by the housing and the outlet orifice is generally aligned with the second opening whereby material within the transfer compartment may be dispensed from the cap through the outlet orifice but material within the container may not be transferred into the transfer compartment, the spout member defining therethrough at least one pressure relief aperture communicating with the transfer compartment and disposed so that when the spout member is in the second position the at least one pressure relief aperture is generally aligned with the at least one pressure relief passage, whereby ambient air may flow into the transfer compartment; the second end including a translucent portion for alignment with the translucent region, permitting visual determination of a quantity of material within the transfer compartment prior to dispensing.

2. A cap for dispensing material from a container as defined in claim 3, wherein the spout member includes indicia disposed at the translucent portion for determining the quantity of material within the transfer compartment.

3. A cap for dispensing material from a container defining an interior portion, comprising:

a housing capable of attachment to the container and including a translucent region, and defining therethrough an aperture, a first opening, and a second opening, a generally domed exterior portion proximate to the second opening and defining a slot proximate to the domed exterior portion and the second opening capable of receiving material dispensed from the container; and a spout member disposed through the aperture and defining a transfer compartment, the spout member having a first end and a second end and defining therethrough an inlet orifice proximate to the first end and an outlet orifice proximate to the second end, the spout member rotatably movable with respect to the housing between a first position where the inlet orifice is disposed to generally align with the first opening and communicate with the interior portion and the outlet orifice is disposed within and closed by the housing whereby material within the container may be transferred from the interior portion into the transfer compartment through the inlet orifice but material may not be dispensed from the container, and a second position where the inlet orifice is disposed within and closed by the housing and the outlet orifice is generally aligned with the second opening whereby material within the transfer compartment may be dispensed from the cap through the outlet orifice but material within the container may not be transferred into the transfer compartment, the second end including a translucent portion for alignment with the translucent region, permitting visual determination of a quantity of material within the transfer compartment prior to dispensing.

4. A cap for dispensing material from a container as defined in either claim 1 or 3, wherein the spout member is rotatably movable with respect to the housing to a third position where the inlet orifice is disposed to at least partially align with the first opening and communicate with the interior portion and the outlet orifice is disposed to at least partially align with the second opening whereby material within the container may be continuously transferred from the interior portion into the transfer compartment through the inlet orifice and from the transfer compartment and the cap through the outlet orifice to be dispensed from the container.

5. A cap for dispensing material from a container as defined in either claim 1 or 3, wherein the spout member includes a projecting graspable tab disposed through a tab bore defined through the housing, whereby rotation of the spout member with respect to the housing may be facilitated.

6. A cap for dispensing material from a container as defined in claim 5, further comprising detent means connected between the housing and the spout member, whereby the spout member may be held in the first position or in the second position against torque less than a preselected magnitude applied to the tab.

7. A cap for dispensing material from a container as defined in claim 3, wherein the housing defines therethrough a drain passage disposed within the slot whereby material received in the slot may be transferred through the housing and into the container.

8. A cap for dispensing material from a container as defined in claim 7, wherein the housing and the spout member define therebetween a trough disposed to communicate with and receive material from the passage.

9. A cap for dispensing material from a container defining at least one pressure relief passage and an interior portion, comprising:
   a housing capable of attachment to the container and including a translucent region, and defining therethrough at least one pressure relief passage, an aperture, a first opening, and a second opening; and
   a spout member disposed through the aperture and defining a transfer compartment, the spout member having a first end and a second end and defining therethrough an inlet orifice proximate to the first end and an outlet orifice proximate to the second end, the spout member rotatably movable with respect to the housing between a first position where the inlet orifice is disposed to generally align with the first opening and communicate with the interior portion and the outlet orifice is disposed within and closed by the housing whereby material within the container may be transferred from the interior portion into the transfer compartment through the inlet orifice but material may not be dispensed from the container, a second position where the inlet orifice is disposed within and closed by the housing and the outlet orifice is generally aligned with the second opening whereby material within the transfer compartment may be dispensed from the cap through the outlet orifice but material within the container may not be transferred into the transfer compartment, the second end including a translucent portion for alignment with the translucent region, permitting visual determination of a quantity of material within the transfer compartment prior to dispensing, and a third position where the inlet orifice is disposed to at least partially align with the first opening and communicate with the interior portion and the outlet orifice is disposed to at least partially align with the second opening whereby material within the container may be continuously transferred from the interior portion into the transfer compartment through the inlet orifice and from the transfer compartment and the cap through the outlet orifice to be dispensed from the container, the spout member defining therethrough at least one pressure relief aperture communicating with the transfer compartment and disposed so that when the spout member is in the second position the at least one pressure relief aperture is generally aligned with the at least one pressure relief passage, whereby ambient air may flow into the transfer compartment.

10. A cap for dispensing material from a container as defined in claim 9, wherein the spout member includes indicia disposed at the translucent portion for determining the quantity of material within the transfer compartment.

11. A cap for dispensing material from a container as defined in claim 9, wherein the spout member includes a projecting graspable tab disposed through a tab bore defined through the housing, whereby rotation of the spout member with respect to the housing may be facilitated.

12. A cap for dispensing material from a container as defined in claim 11, further comprising detent means connected between the housing and the spout member, whereby the spout member may be held in the first position, the second position, or the third position against torque less than a preselected magnitude applied to the tab.

13. A cap for dispensing material from a container as defined in claim 9, wherein the housing includes a generally domed exterior portion proximate to the second opening and defines a slot proximate to the domed exterior portion and the second opening capable of receiving material dispensed from the container.

14. A cap for dispensing material from a container as defined in claim 13, wherein the housing defines therethrough a drain passage disposed within the slot whereby material received in the slot may be transferred through the housing and into the container, and the housing and the spout member define therebetween a trough disposed to communicate with and receive material from the passage.

15. A cap for dispensing material from a container defining at least one pressure relief passage, and an interior portion, comprising:
   a housing capable of attachment to the container and including a translucent region, and defining therethrough at least one pressure relief passage, an aperture, a first opening, and a second opening; and
   a spout member disposed through the aperture and defining a transfer compartment, the spout member having a first end and a second end and defining therethrough an inlet orifice proximate to the first end and an outlet orifice proximate to the second end, the spout member rotatably movable with respect to the housing between a first position where the inlet orifice is disposed to generally align with the first opening and communicate with the interior portion and the outlet orifice is disposed within and closed by the housing whereby material within the container may be transferred from the interior portion into the transfer compartment through the inlet orifice but material may not be dispensed from the container, a second position where the inlet orifice is disposed within and closed by the housing and the outlet orifice is generally aligned with the second opening whereby material within the transfer compartment may be dispensed from the cap through the outlet orifice but material within the container may not be transferred into the transfer compartment, the second end including a translucent portion for alignment with the translucent region, permitting visual determination of a quantity of material within the transfer compartment prior to dispensing, and a third position where the inlet orifice is disposed to at least partially align with the first opening and communicate with the interior portion and the outlet orifice is disposed to at least partially align with the second opening whereby material within the container may be continuously transferred from the interior portion into the transfer compartment through the inlet orifice and from the transfer compartment and the cap through the outlet orifice to be dispensed from the container, the spout member defining therethrough at least one pressure relief aperture communicating with the transfer compartment and disposed so that when the spout member is in the second position the at least one pressure relief aperture is generally aligned with the at least one pressure relief passage, whereby ambient air may flow into the transfer compartment, the spout member including a projecting graspable tab disposed through a tab bore defined through the housing, whereby rotation of the spout member with respect to the housing may be facilitated.

16. A cap for dispensing material from a container as defined in claim 15, wherein the spout member includes indicia disposed at the translucent portion for determining the quantity of material within the transfer compartment.

17. A cap for dispensing material from a container as defined in claim 15, further comprising detent means connected between the housing and the spout member, whereby the spout member may be held in the first position, the second position, or the third position against torque less than a preselected magnitude applied to the tab.

18. A cap for dispensing material from a container as defined in claim 17, wherein the housing includes a generally domed exterior portion proximate to the second opening and defines a slot proximate to the domed exterior portion and the second opening capable of receiving material dispensed from the container.

19. A cap for dispensing material from a container as defined in claim 18, wherein the housing defines therethrough a drain passage disposed within the slot whereby material received in the slot may be transferred through the housing and into the container, and the housing and the spout member define therebetween a trough disposed to communicate with and receive material from the passage.

* * * * *

UNITED STATES PATENT AND TRADEMARK OFFICE
CERTIFICATE OF CORRECTION

PATENT NO. : 6,041,979
DATED : March 28, 2000
INVENTOR(S) : Edward S. Robbins, III, et al.

It is certified that error appears in the above-identified patent and that said Letters Patent is hereby corrected as shown below:

Column 6, claim 2, should read--

A cap for dispensing material from a container as defined in claim [3] 1, wherein the spout member includes indicia disposed at the translucent portion for determining the quantity of material within the transfer compartment.

Signed and Sealed this

Tenth Day of April, 2001

*Attest:*

NICHOLAS P. GODICI

*Attesting Officer*   *Acting Director of the United States Patent and Trademark Office*